(12) United States Patent
Kamo et al.

(10) Patent No.: US 9,024,225 B2
(45) Date of Patent: May 5, 2015

(54) CLAD WELDING METHOD

(75) Inventors: Kazuhiko Kamo, Takasago (JP); Satoru Zenitani, Hiroshima (JP); Hirokazu Kadowaki, Kobe (JP); Naoki Yamasaki, Kobe (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 613 days.

(21) Appl. No.: 13/132,747

(22) PCT Filed: Jun. 25, 2009

(86) PCT No.: PCT/JP2009/061657
§ 371 (c)(1),
(2), (4) Date: Jul. 11, 2011

(87) PCT Pub. No.: WO2010/064464
PCT Pub. Date: Jun. 10, 2010

(65) Prior Publication Data
US 2011/0259854 A1 Oct. 27, 2011

(30) Foreign Application Priority Data

Dec. 5, 2008 (JP) ................. 2008-310406

(51) Int. Cl.
*B23K 9/067* (2006.01)
*B23K 9/073* (2006.01)
(Continued)

(52) U.S. Cl.
CPC .............. *B23K 9/0216* (2013.01); *B23H 1/02* (2013.01); *B23K 9/173* (2013.01); *B23H 1/00* (2013.01);
(Continued)

(58) Field of Classification Search
CPC .......... B23K 9/167; B23K 9/173; B23H 1/00; B23H 1/02
USPC ................. 219/50–85.15, 615–617
See application file for complete search history.

(56) References Cited

U.S. PATENT DOCUMENTS 4,005,306 A * 1/1977 Overby ................. 219/73.21
4,459,062 A * 7/1984 Siebert ................. 403/271
(Continued)

FOREIGN PATENT DOCUMENTS

JP 51-103842 A 9/1976
JP 55-117563 A 9/1980
(Continued)

OTHER PUBLICATIONS

Korean Office Action dated Nov. 5, 2012 (mailed date), issued in corresponding Korean Patent Application No. 10-2011-7012824, with English translation (12 pages).
(Continued)

*Primary Examiner* — Tu B Hoang
*Assistant Examiner* — Thomas Ward
(74) *Attorney, Agent, or Firm* — Westerman, Hattori, Daniels & Adrian, LLP (57) ABSTRACT

A clad welding method, which can prevent the occurrence of incomplete fusion, and can cover the surface of a base material over a wide range with a weld metal, while suppressing the dilution of the weld metal, by use of a relatively simple technique, is provided. For this purpose, a welding heat input is increased at a location where one end (10*a*) of a preceding weld bead (10) and the other end (20*b*) of a succeeding weld bead (20) overlap, as compared with a welding heat input at a location where the preceding weld bead (10) and the succeeding weld bead (20) do not overlap, to produce a deep penetration portion (12*a*) involving locally deep penetration (12).

7 Claims, 7 Drawing Sheets

(51) Int. Cl.
*H05B 1/00* (2006.01)
*B23K 9/02* (2006.01)
*B23K 9/04* (2006.01)
*B23K 9/095* (2006.01)
*B23H 1/02* (2006.01)
*B23K 9/173* (2006.01)
*B23H 1/00* (2006.01)
*B23K 9/167* (2006.01)

(52) U.S. Cl.
CPC ............ *B23K 9/167* (2013.01); *B23K 9/048* (2013.01); *B23K 9/095* (2013.01); *B23K 2201/06* (2013.01); *B23K 2203/04* (2013.01)

(56) References Cited

U.S. PATENT DOCUMENTS

| | | | | |
|---|---|---|---|---|
| 5,321,224 | A | * | 6/1994 | Kamimura et al. ........ 219/76.15 |
| 5,347,098 | A | * | 9/1994 | Murakami et al. ............ 219/61 |
| 6,969,826 | B2 | * | 11/2005 | Trewiler et al. ........... 219/137 R |
| 2009/0026174 | A1 | * | 1/2009 | Moor .......................... 219/76.1 |
| 2010/0059485 | A1 | * | 3/2010 | Hutchison et al. ............. 219/74 |
| 2011/0259854 | A1 | * | 10/2011 | Kamo et al. ............. 219/76.14 |

FOREIGN PATENT DOCUMENTS

| JP | 61-108476 A | 5/1986 |
|---|---|---|
| JP | 62-254971 A | 11/1987 |
| JP | 63-104782 A | 5/1988 |
| JP | 63-165074 A | 7/1988 |
| JP | 6-198439 A | 7/1994 |
| JP | 07-088653 A | 4/1995 |
| JP | 07-100647 A | 4/1995 |
| JP | 07-290242 A | 11/1995 |
| JP | 07-290243 A | 11/1995 |
| JP | 08-090235 A | 4/1996 |
| JP | 10-328829 A | 12/1998 |
| JP | 2000-246436 A | 9/2000 |
| JP | 2000-271742 A | 10/2000 |
| JP | 2000271742 A * | 10/2000 |
| JP | 3205191 B2 | 9/2001 |
| JP | 2003-103372 A | 4/2003 |
| JP | 2003103372 A * | 4/2003 |
| WO | 03/008142 A1 | 1/2003 |

OTHER PUBLICATIONS

International Search Report of PCT/JP2009/061657, mailing date Oct. 6, 2009.

Written Opinion of the International Searching Authority, issued in corresponding International Application No. PCT/JP2009/061657, mailing date Oct. 6, 2009.

Japanese Office Action dated Mar. 4, 2014, issued in Japanese application No. 2013-084962, w/ English translation (9 pages).

Decision to Grant a Patent dated Aug. 26, 2014, issued in Japanese patent application No. 2013-084962 with English Translation (5 pages).

* cited by examiner

CLAD WELDING METHOD

TECHNICAL FIELD

This invention relates to a clad welding method for covering the surface of a base material with a weld metal.

BACKGROUND ART

Many parts of pressure resistant part materials of containers and piping, which are used in maximum temperature portions of subcritical pressure boilers or supercritical pressure boilers in power generating plants, and waste heat boilers in combined cycle power plants, or in semi-high temperature portions of ultra-supercritical pressure boilers in such plants, are composed of carbon steel or low alloy steel. To enhance the corrosion resistance of a site of a base material, such as carbon steel or low alloy steel, which contacts water or steam, it is common practice to build-up weld or overlay a weld metal, such as stainless steel or Ni-base alloy, on the surface of the base material, thereby covering the surface of the base material with the weld metal.

If the base material is fused during welding, the base material and the weld metal mingle, whereby the amount of Cr or Ni added to the weld metal is decreased. Such dilution needs to be suppressed maximally. Welding methods, which suppress the above-mentioned dilution of the weld metal, include a clad welding method which performs welding while weaving a welding torch in a direction perpendicular to the direction of welding (see, for example, Patent Document 1).

Figure 6:
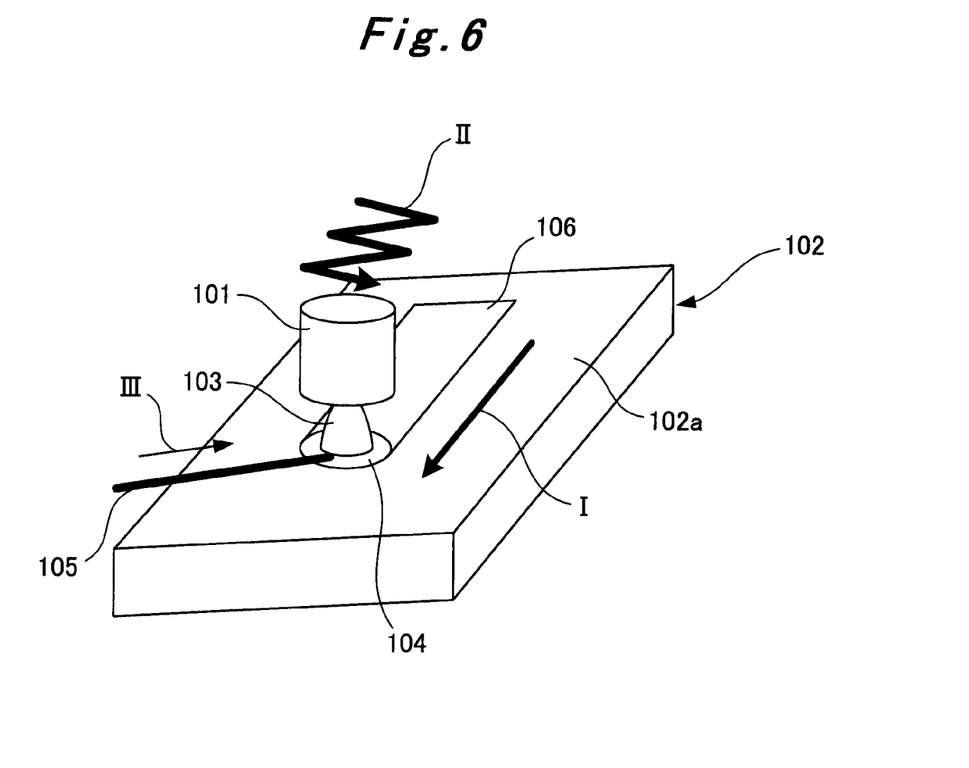
[FIG. 6] is a view for illustrating the clad welding method according to the conventional technology.

This clad welding method will be described by reference to FIG. 6 which is a drawing for illustrating the clad welding method according to a conventional technology. As shown in this drawing, a plasma arc 103 is generated between a plasma torch 101 and a base material 102, whereby a molten pool 104 of a predetermined size is formed in the base material 102. A welding wire 105 as a weld metal is fed to this molten pool 104, whereas the plasma torch 101 is moved in a direction I, where welding proceeds, while being woven in a predetermined cycle. By so doing, a weld bead 106 comprising a part of the welding wire 105 melting into the base material 102 is formed. In FIG. 6, the numeral II denotes the locus of the plasma torch 101, and the numeral III denotes a direction in which the welding wire 105 is fed.

Figure 7A:
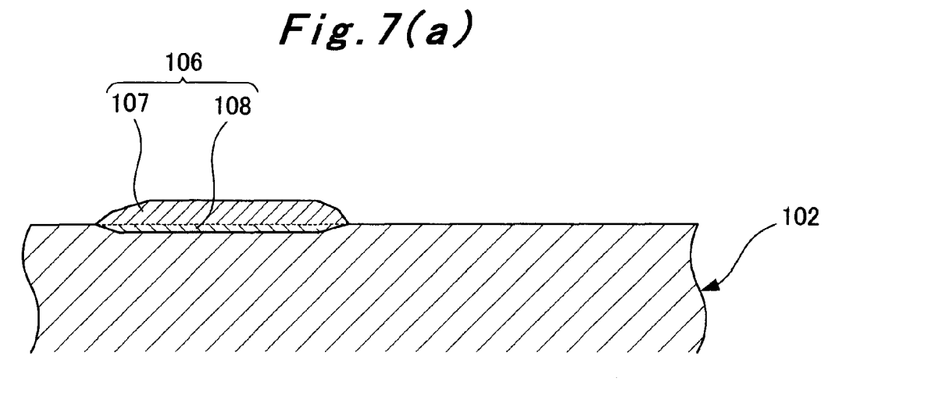
[FIGS. 7(a) to 7(c)] are views for illustrating the clad welding method according to the conventional technology, FIG. 7(a) showing a case where a preceding weld bead is formed, FIG. 7(b) showing a case where a succeeding weld bead is formed, with its other end being superposed on one end of the preceding weld bead, and FIG. 7(c) showing a case where the one end of the preceding weld bead is removed.

As described above, the welding wire 105 is fed to the molten pool 104, whereas the plasma torch 101 is moved in the welding proceeding direction I while being woven. By this measure, the weld bead 106 with minimal penetration of a weld metal 107 into the base material 102 is formed, as shown in FIG. 7(a). In the drawing, the numeral 108 denotes a penetration region where the weld metal 107 melts and penetrates into the base material 102.

Figure 7B:
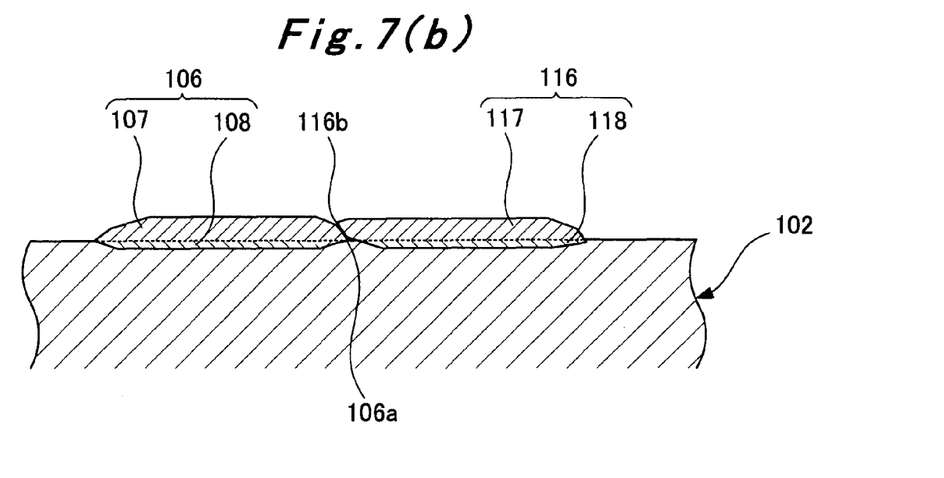
Figure 7C:
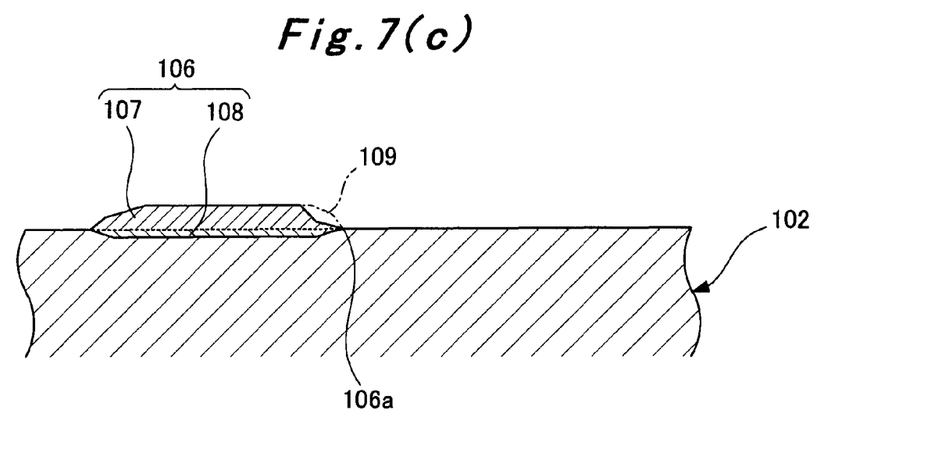

In performing clad welding over a wide range of the base material 102, it is necessary to form a plurality of weld beads, and superpose one end of a preceding weld bead which precedes, and other end of a succeeding weld bead which succeeds. Assume here that welding is performed, with one end 106a of the preceding weld bead 106 being superposed by other end 116b of a succeeding weld bead 116, as shown in FIG. 7(b). In this case, at the other end 116b of the succeeding weld bead 116, a weld metal 117 does not fully melt into the base material 102, and lack of fusion or incomplete fusion tends to occur. In FIG. 7(b), the numeral 117 denotes the weld metal in the succeeding weld bead 116, and the numeral 118 denotes a penetration region where the weld metal 117 in the succeeding weld bead 116 melts into the base material 102. Thus, as shown in FIG. 7(c), a weld metal 109 in the one end 106a of the preceding weld bead 106 is removed by a grinder, and welding is performed, with the other end of the succeeding weld bead being superposed on this removed site 109. By so doing, the occurrence of the above-mentioned incomplete fusion has been prevented.

PRIOR ART DOCUMENTS

Patent Documents

Patent Document 1: International Publication 03/008142, pamphlet (see page 6, lines 1 to 32, etc.)

SUMMARY OF THE INVENTION

Problems to be Solved by the Invention

However, in covering the surface of the base material over a wide range with the weld metal, as mentioned above, the necessity for performing the work of removing the one end of the preceding weld bead arises, in addition to the welding operation. Moreover, the work of removal increases with the breadth of covering of the surface of the base material with the weld metal, thus posing the problem that the operation becomes complicated.

The present invention has been proposed in the light of the above-described problems. It is an object of the invention to provide a clad welding method which can prevent the occurrence of incomplete fusion, and can cover the surface of a base material over a wide range with a weld metal, while suppressing the dilution of the weld metal, by use of a relatively simple technique.

Means for Solving the Problems

A clad welding method according to a first aspect of the present invention for solving the above problems is a clad welding method which includes generating an arc between a welding torch and a base material to form a molten pool, feeding a weld metal to the molten pool, moving the welding torch in a direction of welding while weaving the welding torch to form a weld bead, and forming a next weld bead sequentially in an area adjacent to the formed weld bead in such a manner as to superpose one end of the preceding weld bead which precedes, and other end of the succeeding weld bead which succeeds, the clad welding method comprising:

increasing a welding heat input at a location where the one end of the preceding weld bead and the other end of the succeeding weld bead overlap, as compared with a welding heat input at a location where the preceding weld bead and the succeeding weld bead do not overlap, to produce a deep penetration portion involving locally deep penetration.

A clad welding method according to a second aspect of the present invention for solving the above problems is the clad welding method according to the first aspect of the present invention, wherein the increasing of the welding heat input is performed by temporarily stopping the weaving of the welding torch when the welding torch is located at the one end of the preceding weld bead, or at the other end of the succeeding weld bead.

A clad welding method according to a third aspect of the present invention for solving the above problems is the clad welding method according to the first aspect of the present invention, wherein the increasing of the welding heat input is performed by increasing a welding current when the welding torch is located at the one end of the preceding weld bead, or at the other end of the succeeding weld bead, as compared with a welding current when the welding torch is located at a location other than the one end of the preceding weld bead, or at a location other than the other end of the succeeding weld bead.

A clad welding method according to a fourth aspect of the present invention for solving the above problems is the clad welding method according to the first aspect of the present invention, wherein the increasing of the welding heat input is performed by decreasing an amount of the weld metal fed when the welding torch is located at the one end of the preceding weld bead, or at the other end of the succeeding weld bead, as compared with an amount of the weld metal fed when the welding torch is located at a location other than the one end of the preceding weld bead, or at a location other than the other end of the succeeding weld bead.

A clad welding method according to a fifth aspect of the present invention for solving the above problems is the clad welding method according to the first aspect of the present invention, wherein the increasing of the welding heat input is performed by temporarily stopping the weaving of the welding torch when the welding torch is located at the one end of the preceding weld bead, or at the other end of the succeeding weld bead, and also increasing a welding current when the welding torch is located at the one end of the preceding weld bead, or at the other end of the succeeding weld bead, as compared with a welding current when the welding torch is located at a location other than the one end of the preceding weld bead, or at a location other than the other end of the succeeding weld bead.

A clad welding method according to a sixth aspect of the present invention for solving the above problems is the clad welding method according to the first aspect of the present invention, wherein the increasing of the welding heat input is performed by temporarily stopping the weaving of the welding torch when the welding torch is located at the one end of the preceding weld bead, or at the other end of the succeeding weld bead, and also increasing a welding current, while decreasing an amount of the weld metal fed, when the welding torch is located at the one end of the preceding weld bead, or at the other end of the succeeding weld bead, as compared with a welding current and an amount of the weld metal fed, when the welding torch is located at a location other than the one end of the preceding weld bead, or at a location other than the other end of the succeeding weld bead.

Effects of the Invention

According to the clad welding method concerned with the present invention, the welding heat input is increased at the location where the one end of the preceding weld bead and the other end of the succeeding weld bead overlap, as compared with the welding heat input at the location where the preceding weld bead and the succeeding weld bead do not overlap, to produce the deep penetration portion involving locally deep penetration. By so doing, the occurrence of incomplete fusion when the preceding weld bead and the succeeding weld bead are superposed can be prevented, and the surface of the base material can be covered over a wide range with the weld metal, with the dilution of the weld metal being suppressed, by use of the relatively simple technique.

MODE FOR CARRYING OUT THE INVENTION

Embodiments of the clad welding method according to the present invention will be described based on FIGS. 1(a), 1(b) to FIG. 4.

Figure 1A:
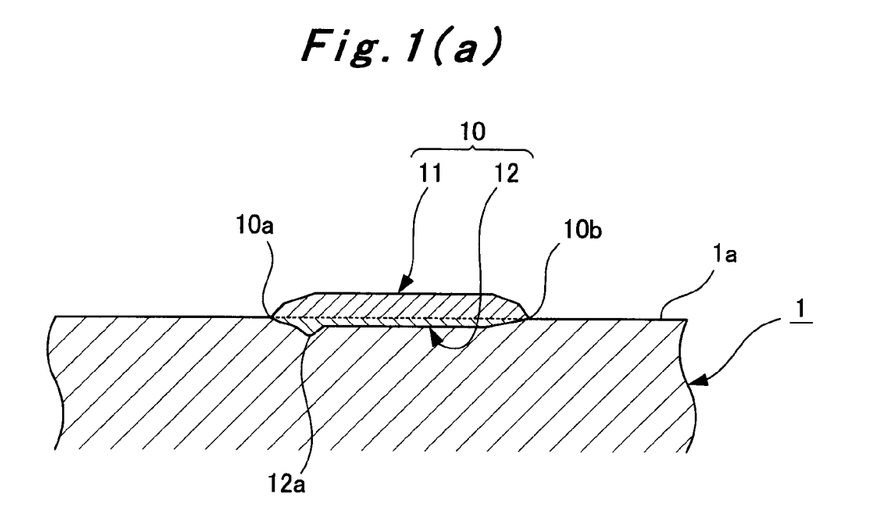
[FIGS. 1(a) and 1(b)] are views for illustrating an embodiment of the clad welding method according to the present invention, FIG. 1(a) showing a state where a preceding weld bead is formed, and FIG. 1(b) showing a state where a succeeding weld bead is formed, with its other end being superposed on one end of the preceding weld bead.
Figure 1B:
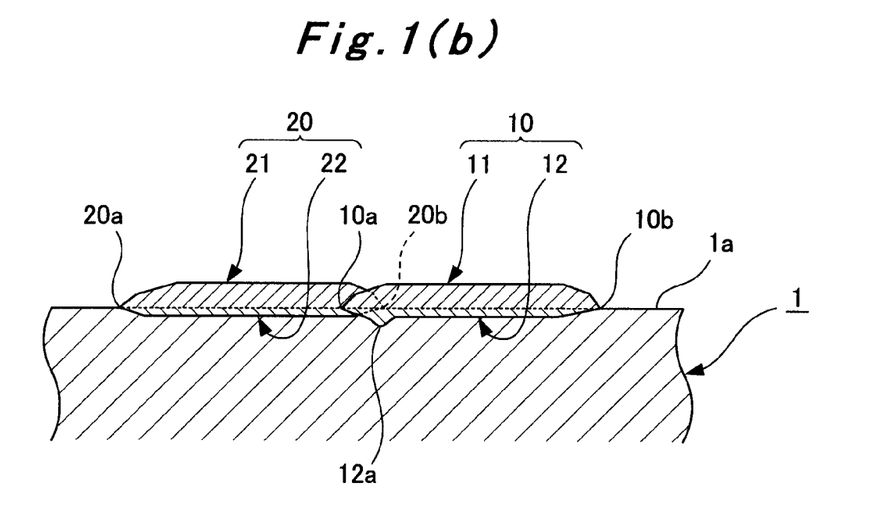
Figure 2A:
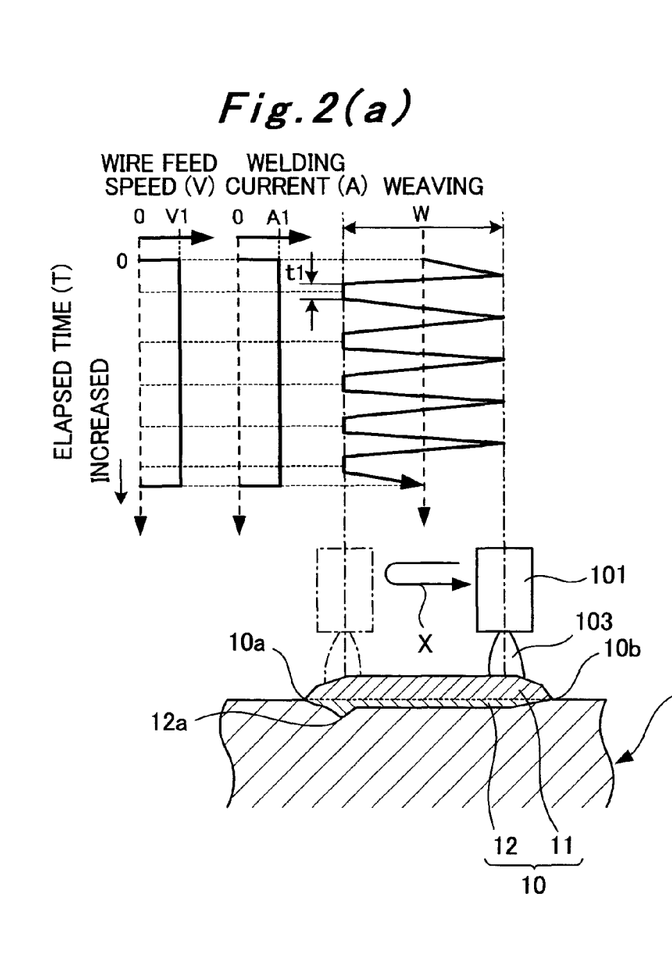
[FIGS. 2(a) and 2(b)] are views for illustrating a first embodiment of the clad welding method according to the present invention, FIG. 2(a) showing the case of the clad welding method according to the first embodiment, and FIG. 2(b) showing the case of the clad welding method according to the conventional technology.
Figure 2B:
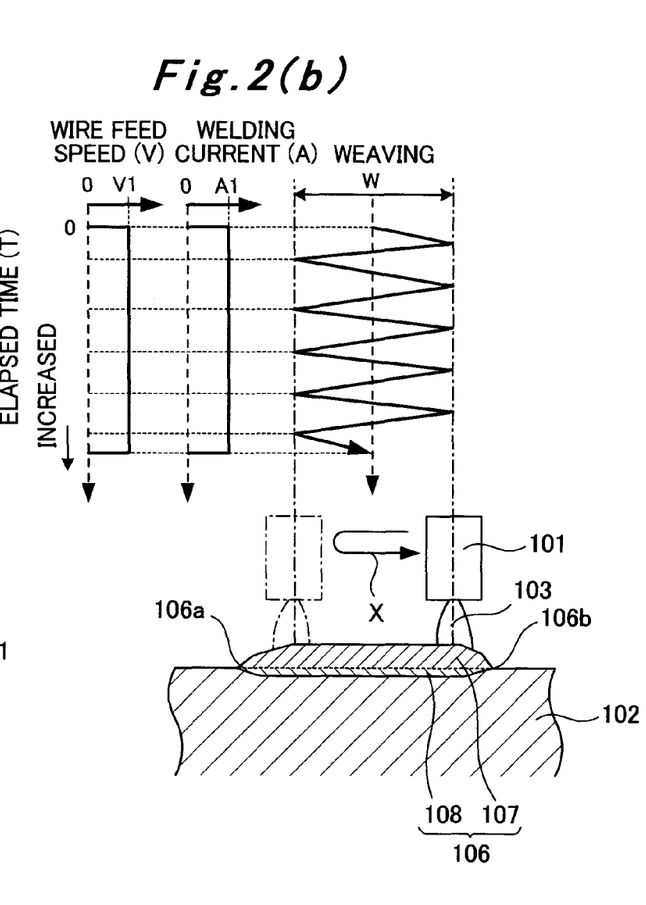
Figure 3:
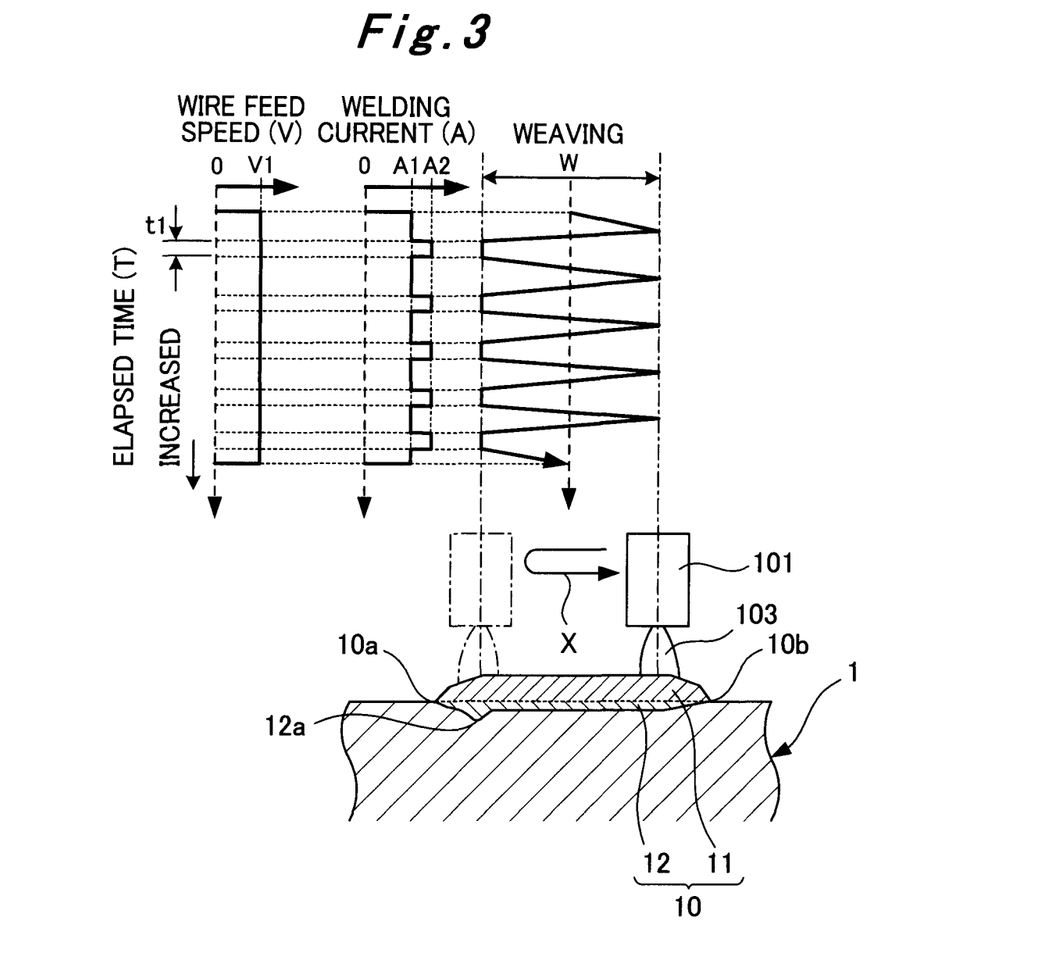
[FIG. 3] is a view for illustrating a second embodiment of the clad welding method according to the present invention.
Figure 4:
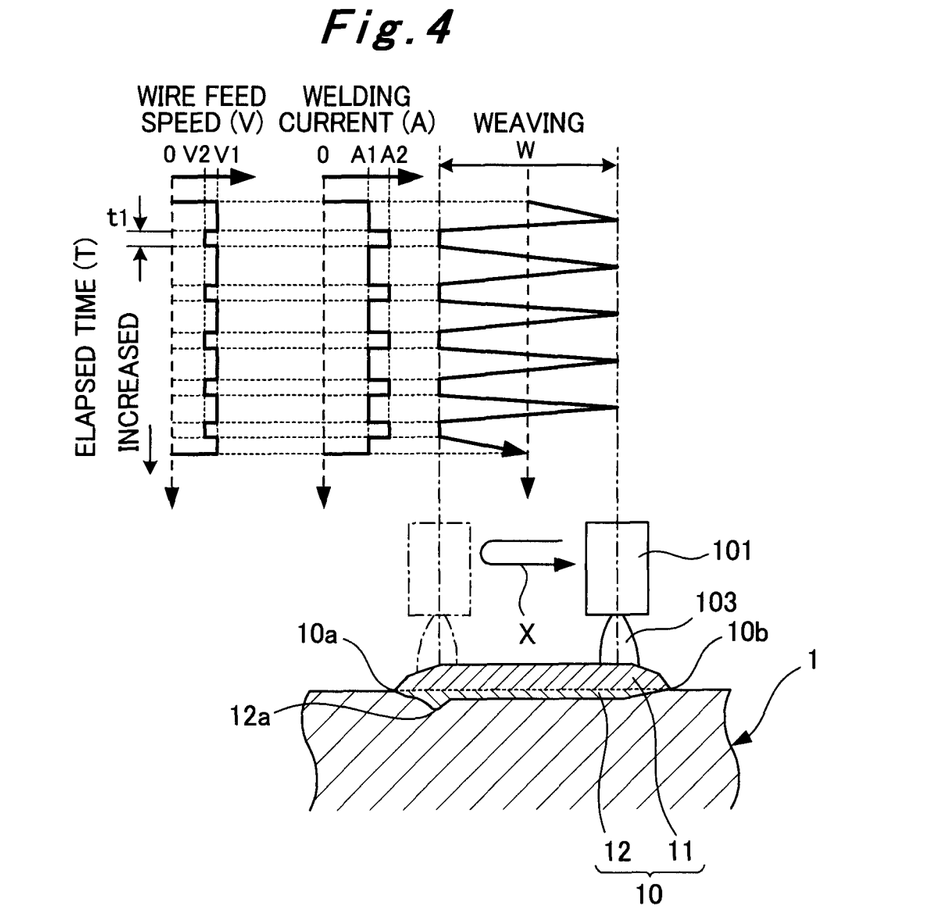
[FIG. 4] is a view for illustrating a third embodiment of the clad welding method according to the present invention.

FIGS. 1(a) and 1(b) are views for illustrating the clad welding method, FIG. 1(a) showing a state where a preceding weld bead is formed, and FIG. 1(b) showing a state where a succeeding weld bead is formed, with its other end being superposed on one end of the preceding weld bead. FIGS. 2(a) and 2(b) are views for illustrating the clad welding method according to a first embodiment, FIG. 2(a) showing the case of the clad welding method according to the first embodiment, and FIG. 2(b) showing the case of the clad welding method according to the conventional technology. FIG. 3 is a view for illustrating the clad welding method according to a second embodiment. FIG. 4 is a view for illustrating the clad welding method according to a third embodiment. In FIG. 2(a), FIG. 2(b), FIG. 3 and FIG. 4, the symbol X denotes the direction of weaving of a welding torch.

With the clad welding method according to the present embodiments, an arc is generated between a welding torch and a base material to form a molten pool, and a weld metal is fed to the molten pool. During this process, the welding torch is moved in the direction of welding while being woven to form a weld bead. A next weld bead is formed sequentially in an area adjacent to the weld bead formed. That is, the welding torch is moved to the area adjacent to the formed weld bead, and the weld metal is fed to the molten pool produced by generating the arc between the welding torch and the base material. At the same time, the welding torch is moved in the welding direction while being woven to form the next weld bead. In this manner, the formation of the weld bead is performed repeatedly, whereby the surface of the base material is covered over a board range with the weld metal. As a result, the preceding weld beads which precede and the succeeding weld beads which succeed are formed such that one end of the preceding weld bead (the Nth weld bead) and other end of the succeeding weld bead (the (N+1) th weld bead) are superposed. Here, a welding heat input is increased at a location where the one end of the preceding weld bead and the other end of the succeeding weld bead overlap, as compared with a welding heat input at a location where the preceding weld bead and the succeeding weld bead do not overlap, to produce a deep penetration portion where penetration is locally deep.

Concretely, as shown in FIG. 1(a), an Nth weld bead 10 (hereinafter referred to as a preceding weld bead) is formed on a surface 1a of a base material 1. At this time, a welding heat input to the base material 1 is increased in the vicinity of one end 10a of the preceding weld bead 10, concretely, at a location where the one end 10a of the preceding weld bead 10 overlaps other end 20b of a next bead, an (N+1) weld bead 20 (hereinafter referred to as a succeeding weld bead), thereby producing a deep penetration portion 12a, where penetration is locally deep, in a penetration region 12. The penetration region 12 is a region where a weld metal 11 melts into the base material 1. A region other than the one end 10a of the preceding weld bead 10, for example, other end 10b, has the same depth of penetration as that created by the conventional clad welding method.

Examples of a technique for producing the deep penetration portion 12a are a technique which comprises temporarily stopping the weaving of the welding torch (not shown) when the welding torch is located at the one end 10a of the preceding weld bead 10; a technique which comprises increasing a welding current when the welding torch is located at the one end 10a of the preceding weld bead 10, as compared with a welding current when the welding torch is located at a location other than the one end 10a of the preceding weld bead 10; a technique which comprises decreasing the amount of the weld metal fed when the welding torch is located at the one end 10a of the preceding weld bead 10, as compared with the amount of the weld metal fed when the welding torch is located at a location other than the one end 10a of the preceding weld bead 10; and a technique comprising a combination of these techniques.

Then, as shown in FIG. 1(b), the succeeding weld bead 20 is formed on the side of the one end 10a of the preceding weld bead 10. At this time, the other end 20b of the succeeding weld bead 20 is superposed on the one end 10a of the preceding weld bead 10. By this measure, the depth of a penetration region 22 in the other end 20b of the succeeding weld bead 20 can be ensured by the deep penetration portion 12a in the penetration region 12 of the preceding weld bead 10, so that the occurrence of incomplete fusion can be suppressed.

Experience teaches that if the depth of the penetration region 12 is of the order of 1 mm, there is a possibility for incomplete fusion to be caused at a location where the one end 10a of the preceding weld bead 10 and the other end 20b of the succeeding weld bead 20 overlap. If the depth of the deep penetration portion 12a is extremely great, on the other hand, Cr or Ni in the weld metal 11 melts into the base material 1, partially diluting the weld metal 11, with the result that corrosion resistance may partly fail to be ensured.

According to the clad welding method concerned with the present embodiments, therefore, the welding heat input is increased at the location where the one end 10a of the preceding weld bead 10 and the other end 20b of the succeeding weld bead 20 overlap, as compared with the welding heat input at the location where the preceding weld bead 10 and the succeeding weld bead 20 do not overlap, to produce the deep penetration portion 12a locally. By so doing, the depth of the penetration region 22 in the other end 20b of the succeeding weld bead 20 can be ensured by the deep penetration portion 12a in the preceding weld bead 10. Thus, the occurrence of incomplete fusion at the location of superposition of the one end 10a of the preceding weld bead 10 and the other end 20b of the succeeding weld bead 20 is prevented, with the dilution of the weld metal being suppressed. In this manner, the surface of the base material 1 can be covered with the weld metal. Moreover, after the preceding weld bead is formed, the succeeding weld bead can be formed, without performing the work of removing one end of the preceding weld bead by the grinder, as in the past. Consequently, the operation can be performed relatively easily.

[First Embodiment]

In a first embodiment of the present invention, an explanation will be offered for the case where the weaving of the welding torch is temporarily stopped when the welding torch is located at the one end of the preceding weld bead.

In the present embodiment, as shown in FIG. 2(a), the wire feed speed is maintained at a predetermined speed V1 from a time when the formation of the preceding weld bead 10 is started until a time when the formation of the preceding weld bead 10 is completed. By this measure, the amount of heat decreased from the molten pool formed in the base material 1 is maintained at a constant value. The welding current is also maintained at a predetermined value A1 from the time when the formation of the preceding weld bead 10 is started until the time when the formation of the preceding weld bead 10 is completed. According to these features, a constant amount of heat is supplied to the base material 1.

In addition, a welding torch 101 is woven with a width W of a predetermined amplitude and, when the welding torch 101 is located at the one end 10a of the weld bead 10, the weaving of the welding torch 101 is stopped temporarily, namely, for a time of t1 seconds. Here, the weaving of the welding torch 101 is stopped 5 times until the formation of the preceding weld bead 10 is completed. By so controlling the weaving of the welding torch 101, the welding heat input is increased at the one end side in the molten pool formed by generation of an arc 103 between the welding torch 101 and the base material 1, in comparison with the welding heat input at a location other than the one end. As a result, at the relevant site (in the vicinity of the one end 10a of the preceding weld bead 10), the deep penetration portion 12a is produced within the penetration region 12. With the conventional technology, as shown in FIG. 2(b), the wire feed speed is maintained at the predetermined speed V1 from a time when the formation of a preceding weld bead 106 is started until a time when the formation of the preceding weld bead 106 is completed; during this period, the welding current is maintained at the predetermined value A1, and the welding torch 101 is woven with the width W of the predetermined amplitude. By this measure, a constant amount of heat is supplied to a base material 102. Thus, a penetration region 108 is shallow at one end 106a and the other end 106b of the weld bead 106.

Subsequently, a succeeding weld bead, which is a next weld bead, is formed, with other end of the succeeding weld bead being superposed on the one end 10a of the aforementioned preceding weld bead 10.

According to the clad welding method concerned with the present embodiment, therefore, the weaving of the welding torch 101 is temporarily stopped when the welding torch 101 is located at the one end 10a of the preceding weld bead 10, whereby the welding heat input is increased. As a result, the deep penetration portion 12a is formed in the vicinity of the one end 10a of the preceding weld bead 10. The other end of the succeeding weld bead is superposed on the deep penetration portion 12a. By so doing, the depth of the penetration region in the other end of the succeeding weld bead can be ensured by the deep penetration portion 12a of the preceding weld bead 10. Thus, the occurrence of incomplete fusion at the location of superposition of the one end 10a of the preceding weld bead 10 and the other end of the succeeding weld bead is prevented, with the dilution of the weld metal being suppressed. In this manner, the surface of the base material can be covered with the weld metal. Furthermore, after the preceding weld bead is formed, the succeeding weld bead can be formed, without the need to perform the work of removing the one end of the preceding weld bead by the grinder, as in the past. Consequently, the operation can be performed relatively easily.

[Second Embodiment]

In a second embodiment of the present invention, an explanation will be offered for the case where when the welding torch is located at the one end of the preceding weld bead, the weaving of the welding torch is temporarily stopped, and the welding current is temporarily increased at this time.

In the present embodiment, as shown in FIG. 3, the wire feed speed is maintained at the predetermined speed V1 from a time when the formation of the preceding weld bead 10 is started until a time when the formation of the preceding weld bead 10 is completed. By this measure, the amount of heat decreased from the molten pool formed in the base material 1 is maintained at a constant value.

In addition, the welding torch 101 is woven with a width W of a predetermined amplitude and, when the welding torch 101 is located at the one end 10a of the preceding weld bead 10, the weaving of the welding torch 101 is stopped temporarily, namely, for a time of t1 seconds. Furthermore, while the weaving of the welding torch 101 is stopped for t1 seconds, the welding current is maintained at a second predetermined value A2 (>predetermined value A1) higher than when the welding torch 101 is located at a location other than the one end 10a of the preceding weld bead 10. By so doing, the welding heat input is increased at the one end side in the molten pool formed by generation of the arc 103 between the welding torch 101 and the base material 1, in comparison with the welding heat input at the location other than the one end. As a result, at the relevant site (in the vicinity of the one end 10a of the preceding weld bead 10), the deep penetration portion 12a is produced within the penetration region 12.

Subsequently, a succeeding weld bead, which is a next weld bead, is formed, with other end of the succeeding weld bead being superposed on the one end 10a of the aforementioned preceding weld bead 10.

According to the clad welding method concerned with the present embodiment, therefore, when the welding torch 101 is located at the one end 10a of the preceding weld bead 10, the weaving of the welding torch 101 is temporarily stopped and, while the weaving of the welding torch 101 is stopped, the welding current is increased, in comparison with the welding current when the welding torch 101 is located at a location other than the one end 10a of the preceding weld bead 10, whereby the welding heat input is increased. As a result, the deep penetration portion 12a is formed in the vicinity of the one end 10a of the preceding weld bead 10. The other end of the succeeding weld bead is superposed on the deep penetration portion 12a. By so doing, the depth of the penetration region in the other end of the succeeding weld bead can be ensured by the deep penetration portion 12a of the preceding weld bead 10. Thus, the occurrence of incomplete fusion at the location of superposition of the one end 10a of the preceding weld bead 10 and the other end of the succeeding weld bead is prevented, with the dilution of the weld metal being suppressed. In this manner, the surface of the base material can be covered with the weld metal. Furthermore, after the preceding weld bead is formed, the succeeding weld bead can be formed, without the need to perform the work of removing the one end of the preceding weld bead by the grinder or the like, as in the past. Consequently, the operation can be performed relatively easily.

[Third Embodiment]

In a third embodiment of the present invention, an explanation will be offered for the case where when the welding torch is located at the one end of the preceding weld bead, the weaving of the welding torch is temporarily stopped, and the welding current is temporarily increased, while the wire feed speed is temporarily decreased.

In the present embodiment, as shown in FIG. 4, the welding torch 101 is woven with a width W of a predetermined amplitude and, when the welding torch 101 is located at the one end 10a of the preceding weld bead 10, the weaving of the welding torch 101 is stopped temporarily, namely, for a time of t1 seconds.

Furthermore, when the weaving of the welding torch 101 is stopped for t1 seconds, the welding current is maintained at a second predetermined value A2 (>predetermined value A1) higher than when the welding torch 101 is located at a location other than the one end 10a of the preceding weld bead 10. In addition, when the weaving of the welding torch 101 is stopped for t1 seconds, the wire feed speed is maintained at a second predetermined speed V2 (<first predetermined speed V1) lower than when the welding torch 101 is located at a location other than the one end 10a of the preceding weld bead 10. By so doing, the welding heat input is increased at the one end side in the molten pool formed by generation of the arc 103 between the welding torch 101 and the base material 1, in comparison with the welding heat input at the location other than the one end. As a result, at the relevant site (in the vicinity of the one end 10a of the preceding weld bead 10), the deep penetration portion 12a is produced within the penetration region 12.

Subsequently, a succeeding weld bead, which is a next weld bead, is formed, with other end of the succeeding weld bead being superposed on the one end 10a of the aforementioned preceding weld bead 10.

According to the clad welding method concerned with the present embodiment, therefore, when the welding torch 101 is located at the one end 10a of the preceding weld bead 10, the weaving of the welding torch 101 is temporarily stopped. Moreover, the welding current is increased, and the amount of the weld metal fed is decreased, in comparison with the welding current and the amount of the fed weld metal when the welding torch 101 is located at the location other than the one end 10a of the preceding weld bead 10, whereby the welding heat input is increased. As a result, the deep penetration portion 12a is formed in the vicinity of the one end 10a of the preceding weld bead 10. The other end of the succeeding weld bead is superposed on the deep penetration portion 12a. By so doing, the depth of the penetration region in the other end of the succeeding weld bead can be ensured by the deep penetration portion 12a of the preceding weld bead 10. Thus, the occurrence of incomplete fusion at the location of superposition of the one end 10a of the preceding weld bead 10 and the other end of the succeeding weld bead is prevented, with the dilution of the weld metal being suppressed. In this manner, the surface of the base material can be covered with the weld metal. Furthermore, after the preceding weld bead is formed, the succeeding weld bead can be formed, without the need to perform the work of removing the one end of the preceding weld bead by the grinder or the like, as in the past. Consequently, the operation can be performed relatively easily.

[Other Embodiment]

The foregoing descriptions explain the clad welding method applied in producing the deep penetration portion 12a in the preceding weld bead 10. However, it is possible to adopt the clad welding method by which the deep penetration portion is produced near the other end of the succeeding weld bead. Even this clad welding method exhibits the same actions and effects as those of the clad welding method according to each of the above-described embodiments.

In the above descriptions, the clad welding method for performing plasma welding is explained. However, the clad welding method for TIG welding, MIG welding or the like can be used. Even such a clad welding method exhibits the same actions and effects as those of the clad welding method according to each of the above-described embodiments.

EXAMPLES

A confirmation test conducted to confirm the effects of the clad welding method according to the present invention will be described below. However, the present invention is in no way limited to the confirmation test described below.

[Testing Method]

The present test was conducted to evaluate the relation between the depth of penetration in the deep penetration portion in the penetration region and the welding conditions (welding current at the end, wire feed speed at the end, stop time at the end). Concretely, evaluation was made of the welding conditions in clad-welding a weld metal comprising a Ni-base alloy to a base material comprising a low alloy steel. When a welding torch was located at a location other than one end of a weld bead, a welding current was set at 225 A, and a wire feed speed was set at 11 m/minute. The number of weavings under each of the conditions in Test Example 1, the conditions in Test Example 2, and the conditions in Comparative Test Example 1 refers to the number of weavings of the welding torch in a direction perpendicular to the welding direction with a width of a predetermined amplitude.

Conditions in Test Example 1

As the conditions in Test Example 1, the number of weavings was 16/minute, the welding current at the end was 300 A, the wire feed speed at the end was 6 m/minute, and the stop time at the end was 1.2 seconds, as shown in Table 1 below. Under these welding conditions, the depth of the deep penetration portion in the penetration region was measured.

Conditions in Test Example 2

As the conditions in Test Example 2, the number of weavings was 16/minute, the welding current at the end was 350 A, the wire feed speed at the end was 7 m/minute, and the stop time at the end was 1.2 seconds, as shown in Table 1 below. Under these welding conditions, the depth of the deep penetration portion in the penetration region was measured.

Conditions in Comparative Test Example 1

As the conditions in Comparative Test Example 1, the number of weavings was 16/minute, the welding current at the end was 250 A, the wire feed speed at the end was 7 m/minute, and the stop time at the end was 0 seconds, as shown in Table 1 below. Under these welding conditions, the depth of the penetration region was measured.

TABLE 1

| | Test conditions | | | | | | |
| --- | --- | --- | --- | --- | --- | --- | --- |
| | | End | | | Location other than end | | |
| No. | Number of weavings (times/min) | Welding current (A) | Wire feed speed (m/min) | Stop time (sec) | Welding current (A) | Wire feed speed (m/min) | Depth of penetration (mm) |
| Test Conditions 1 | 16 | 300 | 6 | 1.2 | 225 | 11 | 3.2 |
| Test Conditions 2 | 16 | 350 | 7 | 1.2 | 225 | 11 | 5.4 |
| Comparative Test Conditions 1 | 16 | 250 | 7 | 0 | 225 | 11 | 1.6 |

[Evaluation]

Figure 5A:
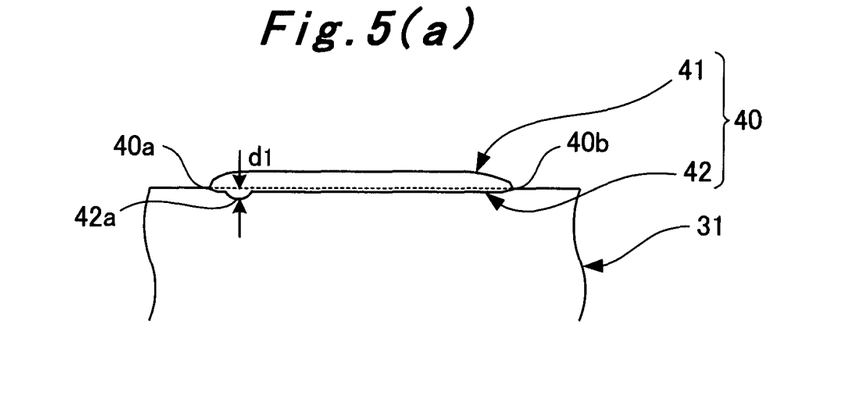
[FIGS. 5(a) to 5(c)] are views showing the results of evaluation of the clad welding method according to the present invention, FIG. 5(a) showing the case of Test Conditions 1, FIG. 5(b) showing the case of Test Conditions 2, and FIG. 5(c) showing the case of Comparative Test Conditions 1.
Figure 5B:
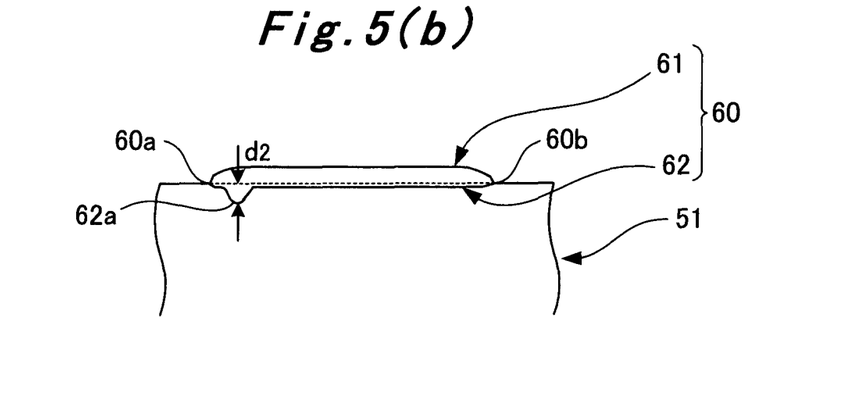
Figure 5C:
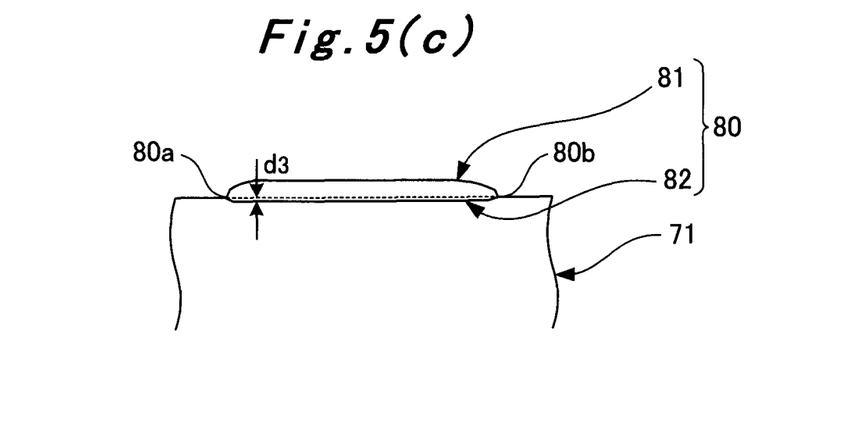

In Test Example 1, the depth d1 of a deep penetration portion 42a was found to be 3.2 mm, as shown in FIG. 5(a). In Test Example 2, the depth d2 of a deep penetration portion 62a was found to be 5.4 mm, as shown in FIG. 5(b). In Comparative Test Example 1, the depth d3 of a penetration region 82 was found to be 1.6 mm, as shown in FIG. 5(c). That is, it was confirmed that the depth of the deep penetration portion in the penetration region was rendered great by increasing the welding current at the end and the stop time at the end. In FIGS. 5(a) to 5(c), the numerals 31, 51 and 71 each denote a base material, the numerals 40, 60 and 80 each denote a weld bead, the numerals 40a, 60a and 80a each denote one end of the weld bead, the numerals 40b, 60b and 80b each denote the other end of the weld bead, the numerals 41, 61 and 81 each denote a weld metal, and the numerals 42, 62 and 82 each denote a penetration region.

As described above, therefore, a welding heat input to the one end of the welding bead is increased, whereby a deep penetration portion involving locally deep penetration is produced. A succeeding weld bead, which is a next weld bead, is formed, with other end thereof being superposed on the one end of the preceding weld bead. As a result, the depth of the penetration region in the other end of the succeeding weld bead can be ensured by the deep penetration portion of the preceding weld bead. Thus, the occurrence of incomplete fusion at the location of superposition of the one end of the preceding weld bead and the other end of the succeeding weld bead is prevented, with the dilution of the weld metal being suppressed. In this manner, the surface of the base material can be covered with the weld metal.

Industrial Applicability

For piping or the like used in a power generation plant or a chemical plant, the clad welding method according to the present invention can prevent the occurrence of incomplete fusion, and can cover the surface of a base material over a wide range with a weld metal, while suppressing the dilution of the weld metal, by use of a relatively simple technique. Thus, the clad welding method can be utilized with immense industrial advantage.

DESCRIPTION OF THE NUMERALS

1 Base material
10 Preceding weld bead
11, 21 Weld metal
12, 22 Penetration region
12a Deep penetration portion
20 Succeeding weld bead

The invention claimed is:

1. A clad welding method, comprising:
generating an arc between a welding torch and a base material to form a molten pool;
feeding a weld metal to the molten pool;
moving the welding torch in a direction of welding while weaving the welding torch to form a weld bead;
forming a next weld bead sequentially in an area adjacent to the formed weld bead in such a manner as to superpose one end of the preceding weld bead which precedes, and other end of the succeeding weld bead which succeeds; and
increasing a welding heat input at a location where the one end of the preceding weld bead and the other end of the succeeding weld bead overlap, as compared with a welding heat input at a location where the preceding weld bead and the succeeding weld bead do not overlap, to produce a deep penetration portion involving locally deep penetration,
wherein the deep penetration portion is formed during the forming of the preceding weld beads and has such a depth that the weld metal is prevented from being melted into the base material and thereby being partially diluted.

2. The clad welding method according to claim 1, wherein the increasing of the welding heat input is performed by temporarily stopping the weaving of the welding torch when the welding torch is located at the one end of the preceding weld bead, or at the other end of the succeeding weld bead.

3. The clad welding method according to claim 1, wherein the increasing of the welding heat input is performed by increasing a welding current when the welding torch is located at the one end of the preceding weld bead, or at the other end of the succeeding weld bead, as compared with a welding current when the welding torch is located at a location other than the one end of the preceding weld bead, or at a location other than the other end of the succeeding weld bead.

4. The clad welding method according to claim 1, wherein the increasing of the welding heat input is performed by decreasing an amount of the weld metal fed when the welding torch is located at the one end of the preceding weld bead, or at the other end of the succeeding weld bead, as compared with an amount of the weld metal fed when the welding torch is located at a location other than the one end of the preceding weld bead, or at a location other than the other end of the succeeding weld bead.

5. The clad welding method according to claim 1, wherein the increasing of the welding heat input is performed by temporarily stopping the weaving of the welding torch when the welding torch is located at the one end of the preceding weld bead, or at the other end of the succeeding weld bead, and also increasing a welding current when the welding torch is located at the one end of the preceding weld bead, or at the other end of the succeeding weld bead, as compared with a welding current when the welding torch is located at a location other than the one end of the preceding weld bead, or at a location other than the other end of the succeeding weld bead.

6. The clad welding method according to claim 1, wherein the increasing of the welding heat input is performed by temporarily stopping the weaving of the welding torch when the welding torch is located at the one end of the preceding weld bead, or at the other end of the succeeding weld bead, and also increasing a welding current, while decreasing an amount of the weld metal fed, when the welding torch is located at the one end of the preceding weld bead, or at the other end of the succeeding weld bead, as compared with a welding current and an amount of the weld metal fed, when the welding torch is located at a location other than the one end of the preceding weld bead, or at a location other than the other end of the succeeding weld bead.

7. The clad welding method according to claim 1, wherein a penetration region is formed by melting the weld metals into a base material, and
the deep penetration portion involves locally deep penetration in the penetration region such that the deep penetration portion is deeper than the penetration region.

* * * * *